(12) United States Patent
Cartwright et al.

(10) Patent No.: US 10,812,401 B2
(45) Date of Patent: Oct. 20, 2020

(54) JITTER BUFFER APPARATUS AND METHOD

(71) Applicant: Dolby Laboratories Licensing Corporation, San Francisco, CA (US)

(72) Inventors: Richard J. Cartwright, Killara (AU); Hannes Muesch, Oakland, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 134 days.

(21) Appl. No.: 16/084,932

(22) PCT Filed: Mar. 16, 2017

(86) PCT No.: PCT/US2017/022658
§ 371 (c)(1),
(2) Date: Sep. 13, 2018

(87) PCT Pub. No.: WO2017/161088
PCT Pub. Date: Sep. 21, 2017

(65) Prior Publication Data
US 2019/0081902 A1 Mar. 14, 2019

(30) Foreign Application Priority Data
Mar. 17, 2016 (EP) ..................... 16160978

(51) Int. Cl.
*H04L 12/841* (2013.01)
*H04L 29/06* (2006.01)
(Continued)

(52) U.S. Cl.
CPC .......... *H04L 47/283* (2013.01); *H04L 1/0042* (2013.01); *H04L 1/0045* (2013.01);
(Continued)

(58) Field of Classification Search
CPC ......... H04L 1/004–0042; H04L 1/0045; H04L 1/205; H04L 29/06176;
(Continued)

(56) References Cited

U.S. PATENT DOCUMENTS

| 6,366,959 B1 | 4/2002 | Sidhu et al. |
| 6,434,606 B1 | 8/2002 | Borella et al. |

(Continued)

OTHER PUBLICATIONS

Liang, G. et al. "Effect of Delay and Buffering on Jitter-Free Streaming over Random VBR Channels" Oct. 3, 2008, IEEE Transactions on Multimedia, vol. 10, Issue 6, 2008, pp. 1128-1141.

*Primary Examiner* — Brendan Y Higa

(57) ABSTRACT

Disclosed is an apparatus and method operative to receive packets of media from a network including a receiver unit operative to receive the packets from the network, a jitter buffer data structure for receiving the packets in an ordered queue, the jitter buffer data structure having a tail into which the packets are input; a plurality of heads defining points in the jitter buffer data structure from which the ordered queue of packets are to be played back, the heads comprise an adjustable actual playback head coupled to an actual playback unit and at least one prototype head, each prototype head having associated therewith a target latency a processor having decision logic operable to determine a cost of achieving the associated target latency for each prototype head, wherein the decision logic compares the costs determined for each prototype head to identify a particular target latency and head location for the actual playback head of the buffer and a playback unit coupled to the processor for actual playback of the playback head of the buffer, such that the particular target latency of the jitter buffer data structure is determined at playback of the buffer rather than upon input of the packets into the jitter buffer data structure.

13 Claims, 7 Drawing Sheets

(51) Int. Cl.
*H04L 1/20* (2006.01)
*H04L 1/00* (2006.01)
*H04L 12/26* (2006.01)
*H04L 12/835* (2013.01)
*H04L 12/939* (2013.01)

(52) U.S. Cl.
CPC ........ *H04L 1/205* (2013.01); *H04L 29/06176* (2013.01); *H04L 29/06496* (2013.01); *H04L 43/087* (2013.01); *H04L 47/30* (2013.01); *H04L 49/555* (2013.01); *H04L 65/4084* (2013.01); *H04L 65/80* (2013.01); *H04L 43/0829* (2013.01)

(58) Field of Classification Search
CPC ......... H04L 29/06476–06523; H04L 41/5087; H04L 43/0823–087; H04L 47/10; H04L 47/283; H04L 47/30; H04L 47/50–56; H04L 49/55–557; H04L 65/00; H04L 65/60–80; H04L 2012/5649
See application file for complete search history.

(56) References Cited

U.S. PATENT DOCUMENTS

| | | | |
|---|---|---|---|
| 6,658,027 B1 * | 12/2003 | Kramer | H04J 3/0632 |
| | | | 370/516 |
| 6,700,895 B1 | 3/2004 | Kroll | |
| 7,058,568 B1 * | 6/2006 | Lewis | G10L 19/005 |
| | | | 370/516 |
| 7,379,466 B2 | 5/2008 | Kavaler | |
| 7,701,980 B1 | 4/2010 | Bugenhagen | |
| 7,835,280 B2 | 11/2010 | Pang | |
| 8,848,525 B2 | 9/2014 | Li | |
| 10,439,951 B2 * | 10/2019 | Muesch | H04L 65/604 |
| 2004/0062260 A1 | 4/2004 | Raetz | |
| 2006/0187970 A1 | 8/2006 | Lee | |
| 2008/0159384 A1 | 7/2008 | Civanlar | |
| 2008/0267224 A1 | 10/2008 | Kapoor | |
| 2014/0072000 A1 | 3/2014 | Shiva | |
| 2014/0269372 A1 | 9/2014 | Roy | |

* cited by examiner

JITTER BUFFER APPARATUS AND METHOD

CROSS-REFERENCE TO RELATED APPLICATIONS

This application claims priority from European Patent Application No. 16160978.9 filed 17 Mar. 2016 which is hereby incorporated by reference in its entirety.

TECHNOLOGY

The present technology relates to an apparatus and method for receiving media signals such as voice and/or video over packet switched networks.

BACKGROUND

A so-called jitter buffer is a key component in any system that attempts to receive media, for example, audio and/or video being streamed over a packet-switched network for real time playback. Examples of such systems include a Voice over Internet Protocol (VoIP) system commonly used for real time media exchanges, such as voice or audiovisual conversations and conferences, for example, VoIP telephony or VoIP conferencing. Other systems include Voice over Long term Evolution (VoLTE) and Voice over Wi-Fi (Vo-WiFi) by way of, for example, an IP Multimedia Subsystem (IMS) network. In relation to a VoIP system, the receiver in such a system attempts to receive voice over a packet network such as the Internet in real time with low latency and high intelligibility. In such a system, packets may arrive out-of-order, packets may be lost, and there may be a variable delay of each packet causing jitter in the signal received caused by the network. The purpose of the jitter buffer is to compensate for the jitter introduced by the network in real time and to enable re-ordering of packets, without introducing too much latency, and without gaps or stutterings.

Consider voice communication as an example. Voice conversations typically occur in spurts, we call talk spurts, between which there is typically silence or only noise. The speech originating end records an input audio soundwave using at least one microphone, digitizes via an analog-to-digital converter (ADC) and codes the input audio signal to compress the data. It is common to divide the input signal into frames of digitized voice segments, for example, frames of 20 ms, and to packetize the frames into packets that each contain one or more frames, and additional information, including a packet sequence number in some systems and/or a frame timestamp such that a receiver can properly re-order the frames should they arrive out-of-order. Other information also may be included in or with a packet.

A common approach for exploiting the fact that there may be low voice activity in conversational speech is to classify the input signal as being of speech or of silence (silence including only background noise), for example, by using a Voice or Signal Activity Detector (VAD) to determine whether a frame is voice or silence. The frames determined to be silence can then be transmitted at reduced data rates. It will be appreciated that there may be other applications where speech detection is not as important within the audio signal. In such applications a VAD may be replaced by a Signal Activity detector (SAD)

The coding of the audio frames may use continuous transmission (CTX) according to which data frames are continuously transmitted, even during periods of speech inactivity, or may use discontinuous transmission (DTX), according to which transmission is discontinued in time intervals of speech inactivity to reduce the overall transmission power. The International Telecommunications Union (ITU) has published several standards for coding and transmission, including the G.722 standard according to which in CTX mode, when speech is absent, a lower rate coding mode is used to continuously encode the background noise. In DTX systems, the transmitter may be switched off during periods of speech non-activity. At the receiver side, to fill the gaps between talk spurts, a synthetic noise known as "comfort noise" may be generated, for example, using transmitted noise information.

In a packetized system, the media frames are packetized for sending between endpoints such that a sequence of packets is sent at a transmit endpoint. In a DTX system, two consecutive packets may have a period of silence between each other, or may be within the same talk spurt. As media packets traverse the network to an intended receiving endpoint, they experience a delay that depends, for example, on the respective route each may take, such that at a receiving endpoint, the packets arrive with different delays, possibly out-of-order, and with some packets lost or delayed by an amount that exceeds an acceptable level.

Consider a receiving endpoint, for example, a VoIP telephone or a VoIP bridge that includes a jitter buffer that uses jitter buffering. The packets arrive in a sequence which may or may not correspond to the sequence they were transmitted, and with different delays, causing what is known as jitter. The conventional approach to jitter buffering involves keeping a queue of packets to be played and picking the next packet for playback from an extraction point—the end of the queue upon each fetch for playback. At the start of each talk spurt, an insertion point into the playback queue is chosen such that the insertion point is some target latency that is forward of the current fetch point of the buffer (the head of the buffer). That is, silence compression or silence expansion is used to approach the target latency. This involves adding empty entries into the packet queue when the first packet of a talk spurt is received.

The target latency may be conventionally pre-determined by maintaining statistics, for example, a histogram of observations of network jitter and pre-setting the target latency to some high percentile of the jitter. For example, the target latency of the jitter buffer may be conventionally configured to track the 95'th percentile of network jitter. In the case of only counting conceals, this means that 5% of packets will arrive too late to be played out and the playback mechanism will include some signal processing to conceal the resulting gap in the media stream. Thus, conventionally, it is upon entry into the jitter buffer that a decision is required as to how to carry out silence compression or expansion to approach the pre-set target latency.

DESCRIPTION OF THE DRAWINGS

Example embodiments are illustrated by way of example, and not by way of limitation, in the figures of the accompanying drawings and in which like reference numerals refer to similar elements.

DETAILED DESCRIPTION

Overview

Figure 1A:
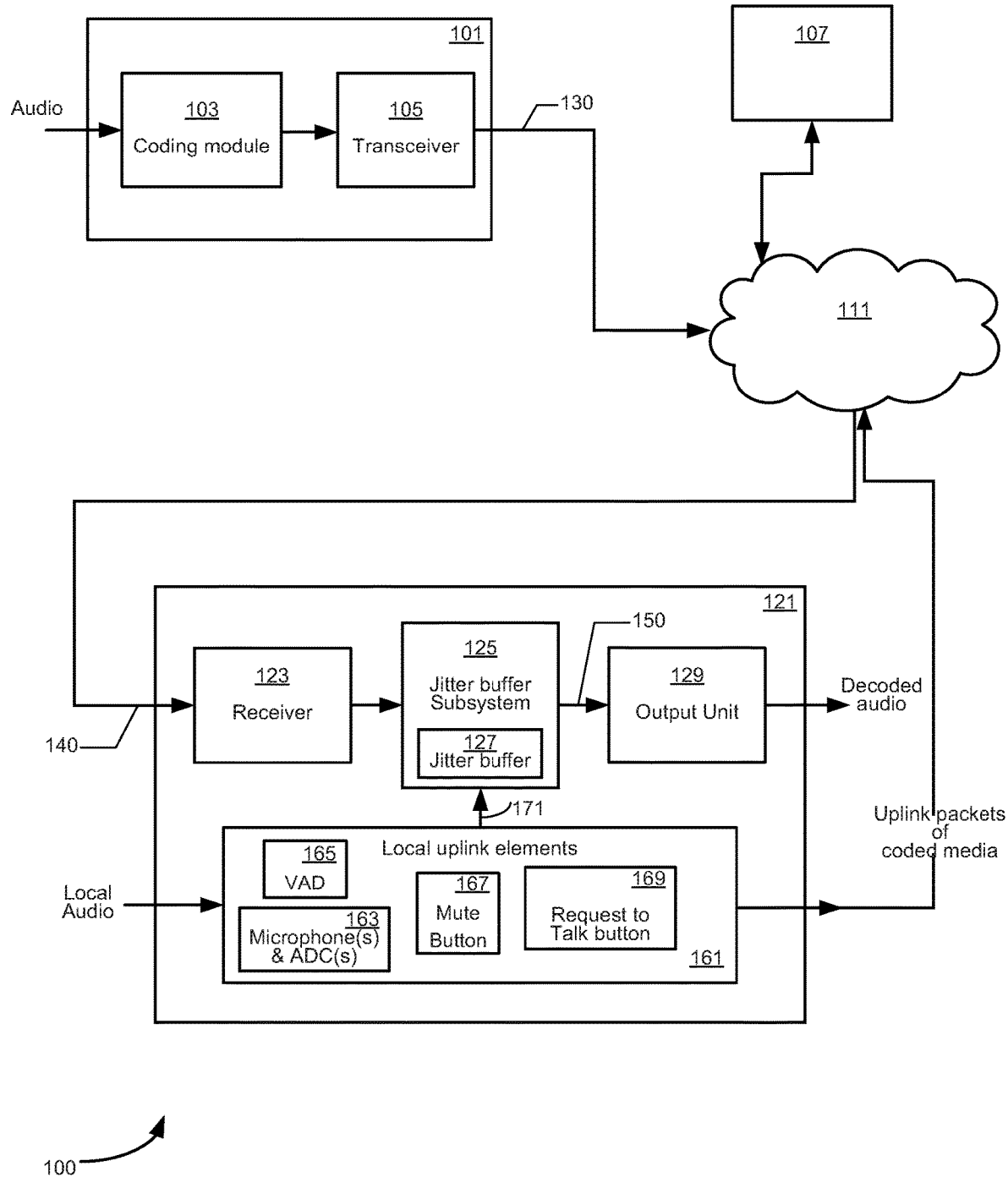
FIG. 1A shows a simplified system that includes an example embodiment of a jitter buffer apparatus.

Described herein are: an apparatus that includes a jitter buffer; a jitter-buffering method; and a computer-readable non-transitory machine-readable medium that includes instructions that causes the apparatus containing one or more processing engines to implement the jitter buffering method. The jitter buffer apparatus includes logic operative to determine a target latency at buffer readout time based on comparison of a set of prototype buffer heads.

Particular embodiments include an apparatus operative to receive packets of media from a network. The apparatus includes a receive unit operative to receive the packets from the network, a jitter buffer data structure that includes a tail wherein packets are inserted and at least one head, each head defining a point in the buffer wherefrom packets may be played back. The heads include an adjustable actual playback head coupled to an actual playback unit, and in some versions, at least one prototype head, each such prototype head having associated therewith a target latency. Decision logic is included and is operative to determine the cost of achieving the associated target latency for each prototype head, the cost determining including examining the cost that would be achieved by outputting at each prototype head one of: a packet, a packet and a content indicator of a first set of content indicators, or no packet and a content indicator of a second set of content indicators. The decision logic compares the costs and determines a particular target latency and head location for an actual playback head of the buffer, the actual playback being coupled to an actual playback unit. In this manner, the particular target latency of the jitter buffer is determined at buffer readout time rather than at buffer input time.

In a particular set of embodiments, each prototype head is coupled to an associated metric unit in the decision logic, the metric unit operative to determine a corresponding performance metric, for example, a performance cost such that in the case the buffer includes a plurality of distinct prototype heads, the performance metric achieved by each prototype head can be compared.

In a particular set of embodiments each metric unit tracks the performance over time of its associated prototype head, thereby determining the corresponding performance metric. In a particular version, the pre-defined time interval is a most recent pre-defined time interval, and the corresponding performance metric is a function of the number of conceals generated using the associated prototype head over the most recent time interval to achieve the associated target latency.

In a particular set of embodiments in which the jitter buffer includes a plurality of distinct prototype heads, the corresponding performance metric penalizes added latency such that for two prototype heads achieving the same packet loss ratio and different target latencies, the prototype head that has the lower target latency achieved has the better performance metric.

In a particular set of embodiments each metric unit tracks the performance over time of its associated prototype head, thereby determining the corresponding performance metric.

In a particular set of embodiments, the jitter buffer includes a plurality of distinct prototype heads, each having an associated target latency, and an actual head having a selected one of the associated target latencies of the prototype heads.

In a particular set of embodiments in which the jitter buffer includes a plurality of distinct prototype heads, the performance metrics of the distinct prototype heads are compared to determine an actual target latency equal to one of the distinct target latencies, the actual head is selected to have the actual target latency is associated, and the output of the buffer to the actual playback unit is from the actual head.

In some versions, the selecting of the actual head selects the prototype head that achieves the best corresponding performance metric.

In a particular set of embodiments, the apparatus includes a mechanism for receiving information on near end activity, and such information is used to determine a measure of interactivity.

Particular example embodiments include a jitter buffering method in an apparatus that includes a jitter buffer data structure and processing hardware. The method includes receiving packets of media from a network; inserting each received packet into the buffer data structure via a tail. The buffer data structure includes at least one head, each head defining a point in the buffer wherefrom packets may be played back. The heads include an adjustable actual playback head coupled to an actual playback unit, and in some versions, at least one prototype head, each such prototype head having associated therewith a target latency. The method includes determining the costs of achieving the associated target latency for each prototype head, the cost determining including examining the cost that would be achieved by outputting at each prototype head one of: a packet, a packet and a content indicator of a first set of content indicators, or no packet and a content indicator of a second set of content indicators. The method further includes calculating and comparing a respective cost function for each respective prototype head having the associated target latency, and selecting a particular target latency and head location for an actual playback head of the buffer based on comparing the costs, the actual playback being coupled to an actual playback unit. In this manner, the method determines the particular target latency of the jitter buffer at buffer readout time rather than at buffer input time. In some versions, the method further includes playing back the media via the actual playback unit.

Other sets of the method embodiments include one or more of the aspects described herein for the apparatus example embodiments.

Particular example embodiments include a non-transitory machine-readable medium coded with instructions, that when executed by a processing system in a receiving endpoint, carry out any one of the above summarized methods.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

FIG. 1A shows a typical system 100 in which the present example embodiment may operate. While the overall structure of FIG. 1A may correspond to known systems, at least the jitter buffer subsystem 125 of the receiving endpoint 121 includes aspects of the example embodiment, and thus, FIG. 1A is not a depiction of a prior art system.

System 100 shows three endpoints 101, 107, and 121 coupled via a packetized communication channel 111, which may be a packet network, for example, the Internet. For ease of description, endpoint 101 may be considered to be a sending endpoint, while endpoint 121 may be considered to be the endpoint receiving packets sent from endpoint 101. In this regard, endpoint 121 may be, for example, part of a call section of system 100, which may be an Internet VoIP system. In the embodiment as show in FIG. 1A, packetized communication channel 111 may be a packet-switched network, for example, the Internet. It will be appreciated by those skilled in the art that in a multipoint conference, each endpoint may be sending and receiving data, and the present description is envisaged to cover such a situation. Furthermore, there may be other elements present within the system 100 that are not shown In FIG. 1A for reasons of brevity and to not obscure the inventive aspects of the present embodiments. In this regard, it is envisaged that the present system may include conference controllers of various kinds, as would be understood by those skilled in the art.

Similarly, for reasons of simplicity, voice communication is assumed with the system of the described embodiments. However, it will be appreciated by those skilled in the art that the embodiments described are also applicable to communication of other types of media content, including video, audio and video, as well as other visual information. Therefore, while speech communication is described herein, this should not be taken to mean that the various example embodiments depicted and described herein should be limited to speech communication.

In accordance with FIG. 1A, audio, including voice, is accepted into the sending endpoint 101, for example, into a VoIP telephone via a coding module 103. In one embodiment, the coding module 103 includes one or more microphones, one or more analog to digital convertors (ADCs), an audio coder to compress the audio, and a packetizer that is operative to packetize the coded audio data into audio packets. The coding module 103 may be further configured to facilitate the insertion of sequence numbers and any other information, for example, timestamps, into the audio packets. Further, a voice activity detector (VAD) or Signal Activity Detector (SAD) may be included in the coding module 103, to insert one or more indicators of voice activity, such as the presence of silence, to the audio packets. The packets are sent, via a transceiver, including a transmit (Tx) network interface 105, to the network 111. In this regard, the sending endpoint module 101 generates an ordered sequence of packets 130 of coded media. The packets of coded media may be in the form of a media stream such as audio data, and the packet sequence 130 may be sent to one or more destinations, for example, to the receiving endpoint 121 via the network 111.

The sequence of packets 130 transmitted from the sending endpoint 101 arrive at the receiving endpoint 121 as a sequence of coded packets 140. In an embodiment, the receiving endpoint 121 may be a VoIP telephone or a VoIP bridge. The sequence of coded packets 140 may or may not correspond to the sequence 130 that was transmitted from the sending endpoint 101. In this regard, the sequence of coded packets 140 received at the receiving endpoint 121 may have some of the packets missing, some of the packets may be received out of order and the packets may have undergone different delays, all this causing what is known as jitter.

The receiving endpoint 121 includes a receiver or receive (Rx) network interface 123 that receives the packets 140 coupled to a jitter buffer subsystem 125 that uses jitter buffering, namely, that includes a jitter buffer data structure, hereinafter referred to as a jitter buffer 127. The purpose of the jitter buffer subsystem 125 is to compensate for the jitter introduced by the network 111 such that after a delay introduced by the jitter buffer subsystem 125, the media stream is output from the jitter buffer subsystem 125 as an ordered sequence 150 of packets to an output unit 129 including a decoder, a conceal processor in those embodiments that conceal missing packets, a forward error control unit in embodiments that include forward error control, and for playback, one or more digital to analog converters (DACs) and one or more amplifiers and loudspeakers that when operating, play back the sequence 150 in real time. In such a system, the latency is low, and the playback is predominately without perceptible gaps or stutterings.

In one embodiment, the sending endpoint 101 is implemented using a first computer running a first VoIP soft-client software application. Such an implementation executes a set of instructions that are coded, for example, stored in a non-transitory medium, such as the computer's memory.

In one embodiment, the receiving endpoint 121 is implemented using a second computer running a second VoIP soft-client software application. In this implementation, the software application executes a second set of instructions that are coded, for example, stored in a non-transitory medium, such as the second computer's memory. Note that the second VoIP soft-client software application may be another instance of the same VoIP soft-client software application as in the first VoIP soft-client software application of the sending endpoint 101. In this regard, the output unit 129 of the receiving endpoint 121 may use audio output hardware stored in the second computer. In other embodiments, the receiving endpoint 121 may be a teleconferencing server or bridge, as will be appreciated by those skilled in the art.

Some embodiments of the receiving endpoint 121 may also include local uplink elements 161 to enable the receiving endpoint 121 to also accept audio and send uplink packets of coded media. The endpoint 121, for example, may include in uplink elements 161: one or more microphone and ADC combinations 163, and may also include one or more of: a local mute button 167 (or equivalent) to mute the one or more microphones 163 thus providing indication within endpoint 121 on engagement and/or disengagement of the local mute button 167; a VAD (or SAD) 165 providing indication within endpoint 121 on local voice activity; and/or an explicit "request to talk" button 169 or equivalent providing indication within endpoint 121 on engagement and/or disengagement of the "request to talk" button. These elements may be provided in varying combinations within the endpoint 121 to provide the jitter buffer subsystem 125 access to information 171 on near end speech.

Figure 1B:
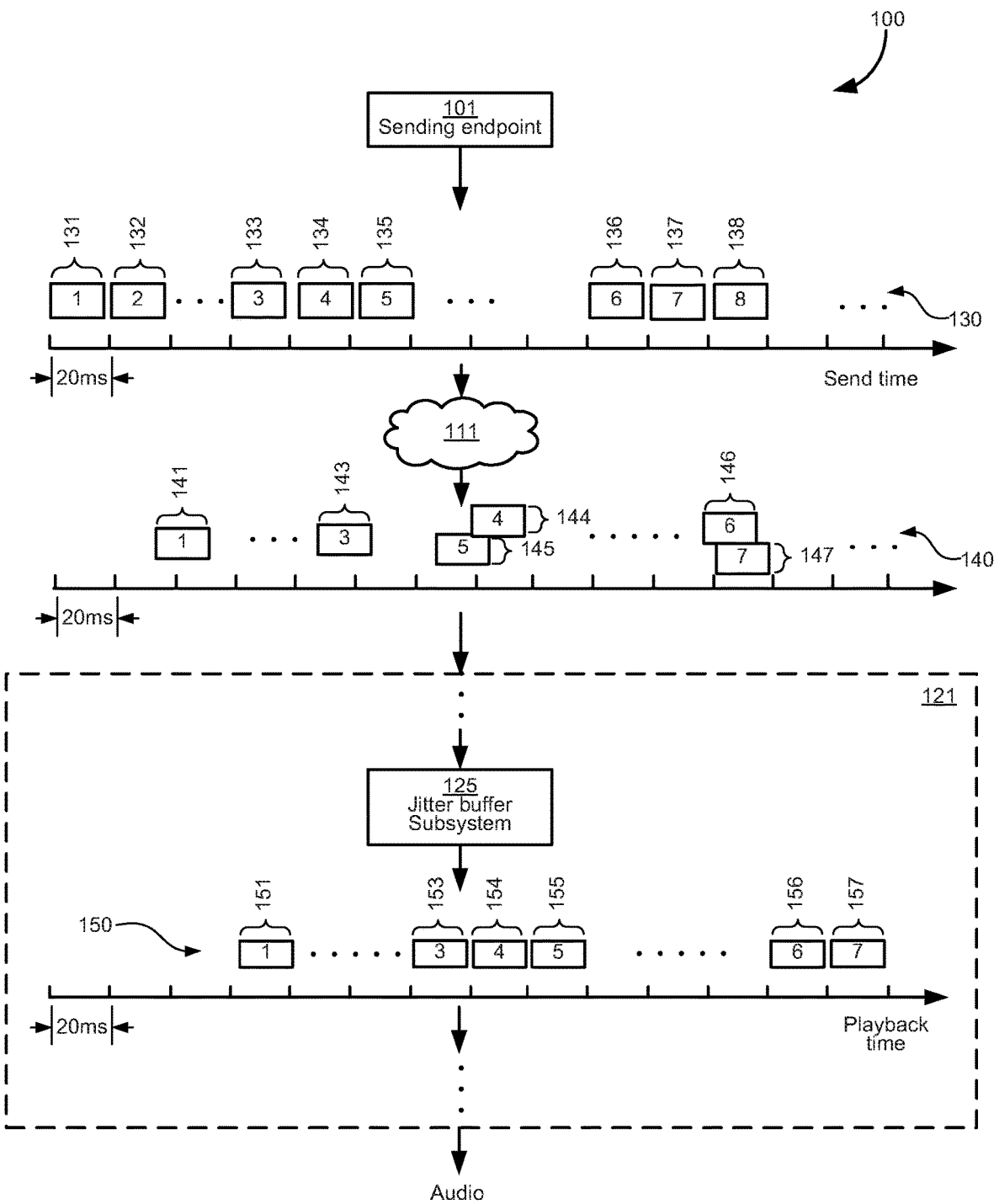
FIG. 1B shows in simplified form an example data flow within the system of FIG. 1A, starting with a packet sequence sent from a sending endpoint, and the data flow within a receiving endpoint according to an example embodiment.

Referring to FIG. 1B, there is shown, in simplified form, the data flow within the system 100. The data flow commences with the sequence of packets 130 generated at the sending endpoint 101, which may be a VoIP telephone, being transmitted to the receiving endpoint 121, which may be a VoIP telephone or bridge playback unit in system 100. The sequence of packets 130 are sent at regular time intervals determined by a dedicated timing source. In an embodiment, the sequence of packets are sent every 20 ms thereby where forming 320 sample periods when the ADC (or ADCs) in the coder module 103 of sending endpoint 111 is configured to sample at 16000 samples per second. The audio signal containing voice may be conventionally partitioned into frames, for example, of 20 ms of audio, and coded by an encoding method, and packetized into the packets having the sequence 130. In the example described herein, each packet carries one 20 ms frame of encoded media, for example, voice encoded using ITU-T rec. G.722 standard encoding, although the example embodiments are certainly not limited to any particular encoding method or packetization scheme, or even to audio. The audio is packetized for sending between endpoints such that a sequence of packets is sent. In a DTX (discontinuous transmission) system, two consecutive packets may have a period of silence between each other, or may be within the same talk spurt. Each packet may be provided with a sequence number, for example, 1, 2, 3, 4, 5, 6, 7, 8 . . . , which allows a receiving endpoint, such as endpoint 121 to re-order the packets as they are received into their correct order for playback. This provides for the receiving endpoint 121 to determine whether packets are missing.

In the embodiment as depicted in FIG. 1B, the sequence of packets 130 includes packets 133-135 which may be packets from one talk spurt which have been given sequence numbers 3, 4, and 5. Packets 136 and 137 with sequence numbers 6 and 7 show, for illustrative purpose, packets from a second talk spurt. In this particular embodiment, the system 100 is assumed to operate in DTX mode where packets are only sent when there is voice activity. In the illustrative example, it will be assumed that there is no voice activity in the timeslots between packets 135 and 136, namely packets with sequence numbers 5 and 6, so that no packets were sent by the sending endpoint 101 in those timeslots.

As the packets traverse the network 111 to the intended receiving endpoint 121, they may experience a delay that may result from any of a variety of reasons. The delay may result from the route taken, with circuitous routes taking longer than direct transmission routes. As a result, at the receiver, the packets may arrive with different delays and possibly out-of-order, and in some instances, some packets may be lost during transmission. In the specific embodiment depicted in FIG. 1B, the packets that were received by the endpoint 121 are shown as a sequence of media stream packets 140 arriving at a receiving endpoint 121, which may be a VoIP telephone or conference bridge. As depicted, the order of receipt of the packets is not the same as the order in which the packets were sent, and for packets 132 and 138, these packets have been lost altogether. As a result, in sequence 140 that is received by the receiving endpoint 121, packets 143-145 with sequence numbers 3, 4, 5 are from the first talk spurt. However, packet 145 with sequence number 4 has been delayed sufficiently so that it arrives after packet 145 with sequence number 5. This is an out-of-order arrival. Further, received packets 144 and 145 with sequence numbers 6 and 7 are from the second talk spurt. However, packet 146 with sequence number 6 has been delayed enough such that it arrives immediately before packet 147. This results in a sequence and spacing of received packets 140 that is significantly different to the sequence 130 of packets transmitted by the sensing endpoint 101.

In accordance with an example embodiment, the jitter buffer subsystem 125 includes a single packet buffer, for example, a single packet queue 127 that contains the arriving packets. The arriving packets are inserted into the packet queue 127 at a tail index location, herein called the "tail" of the single packet buffer queue 127. Each packet is inserted into the single packet buffer queue 127 at the time the packet arrives, without undergoing any silence compression or expansion. The buffer queue 127 includes a plurality of heads, referred to herein as prototype heads, each representing a pointer location in the buffer queue 127 wherefrom packets could be read out to achieve a different one of a set of associated target latencies, each associated target latency being achieved by applying silence compression or expansion, and/or other actions at the time each packet would be read out from the packet queue 127 from that head. The method determines (over a time interval) the performance that would be achieved by using each of the prototype heads.

The output packets are played back at a regular rate, for example, every 20 ms according to a predetermined timing source, for example, every 320 sample periods when the DAC (or DACs) of output unit 129 is configured to sample at 16000 samples per second. Such regular rate is also used when determining the performance achievable using each of the prototype heads.

In such a system, any actions to be applied to the packets, such as silence expansion or contraction, are carried out at packet readout time. This has the advantage of not committing what target latency to use or how the target latency is achieved until the readout time. In the embodiment as depicted in FIG. 1B, there is depicted a readout sequence 150. In this sequence, packets 153-155 (sequence numbers 3, 4, and 5) are from the same first talk spurt. Note that in the sequence 150, the jitter buffer subsystem 125 has put the packets back into correct sequence number order. In this regard, Packets 156 and 157 (sequence numbers 6 and 7) are from the second talk spurt and it should be noted that in the readout sequence 150, there is a gap of three timeslots between playback of the first and the second talk spurts, the same as the gap of three timeslots when they were sent by sending endpoint 101.

Figure 1C:
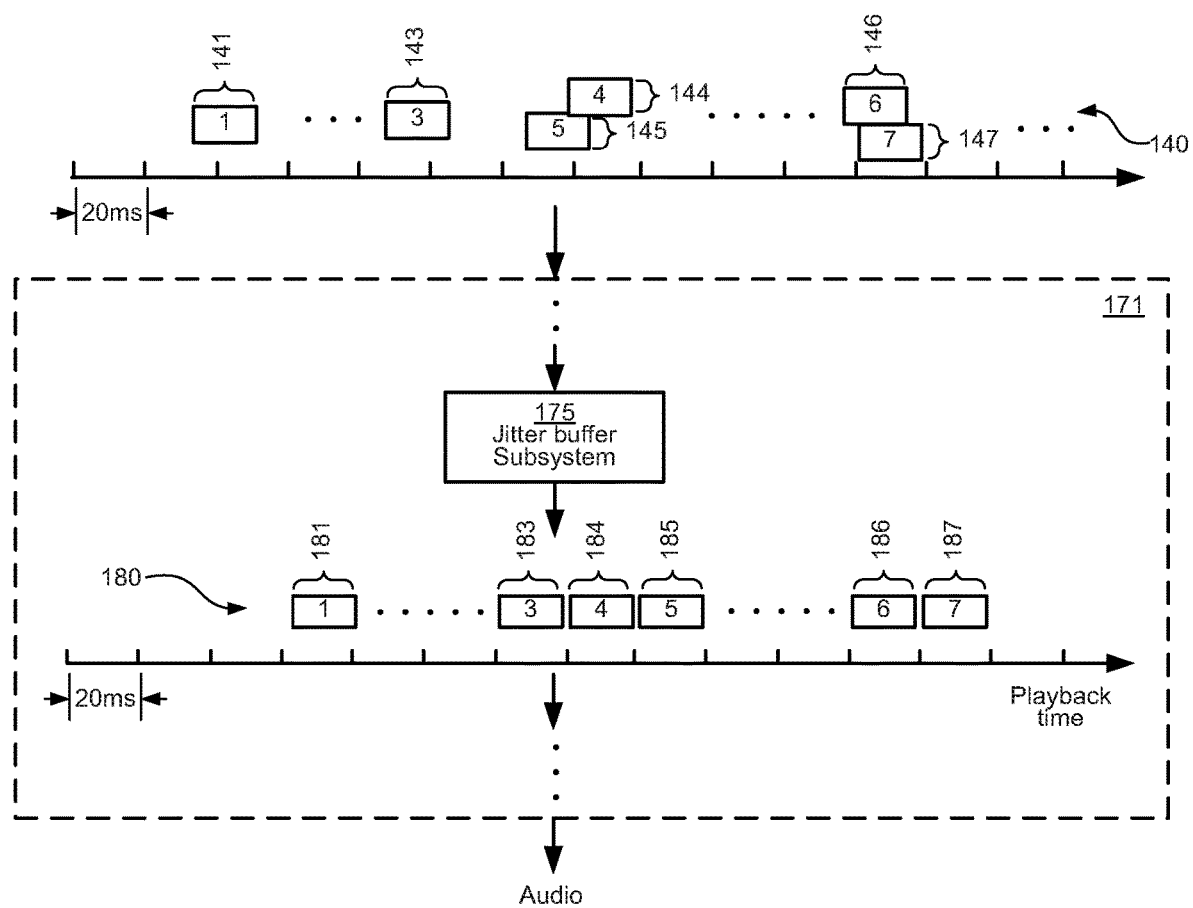
FIG. 1C, which shows an example data flow that might occur in a conventional endpoint with a conventional jitter buffer subsystem in contrast to an endpoint that operates according to an example embodiment.

The embodiment of FIG. 1B is to be viewed in contrast with that shown in FIG. 1C, which shows an example of what might happen in a conventional endpoint 181 with a conventional jitter buffer subsystem 175. The buffer subsystem 175 includes a playback packet queue. As described hereinabove in the "BACKGROUND" section, once a target latency is pre-set, silence compression or expansion is carried on the received packets out at the time the packets are inserted into the playback packet queue in order to achieve the desired pre-set target latency. In such a system, if the queue order of packets lead to undesired effects, there is no means of rectifying the situation. An example result of processing by a conventional jitter buffer subsystem 175 is shown as packet sequence 180 of FIG. 1C, which is played out of the packet queue at regular speed. Due to the processing steps required during the insertion of the packets as they arrive and are placed into the packet queue, the order of the sequence 150 of packets is been corrected from that shown sequence 140. In this regard, packets 183-185 (sequence numbers 3, 4, 5) are packets associated with the first talk spurt and packets 186 and 187 (sequence numbers 6 and 7) are packets associated with the second talk spurt. These packets are depicted in the correct order in sequence 180. However, it should be noted that there is a gap of two timeslots between playback of the first and the second talk spurts, compared to a gap of three timeslots when they were originally sent from the sending endpoint, as shown in FIG. 1B. This reduction in the time interval between the first and second talk spurts is due to the jitter buffer subsystem 175 performing silence compression in order to reduce the latency of the system to match the pre-set target latency.

In contrast to this conventional approach of deciding what silence compression or expansion to apply at the time the packets are inserted into a playback queue, an example embodiment uses a single jitter buffer data structure 127 of packets, the jitter buffer data structure 127 having a single tail wherein arriving packets are inserted, and one or more—typically more than one—prototype head(s) from which packets may be removed for playback. Each prototype head may be associated with a typically distinct target latency. The proposed jitter buffer subsystem 125 is then operable to track the performances of the system over time which would result should each prototype head be used, and is then operable to choose the target latency that optimizes a cost function of the system, taking into account the tracked performance and the resultant latency. The resultant chosen target latency is then used by an actual playback unit at an actual head of the packet, such that the playback unit provides the final packet stream 150 for playback via the output unit 129, with the jitter buffer subsystem 125 having the chosen target latency. In this arrangement, the decision as to what target latency the jitter buffer subsystem 125 has, is made at the time that packets are extracted from the buffer at buffer readout time, which is based on a cost function that compares the costs that different target latencies would achieve. This is conducted in preference to such systems which require that the target latency choice is made at the time packets are inserted into a jitter buffer data structure 127, as is done with a traditional jitter buffer.

Figure 2:
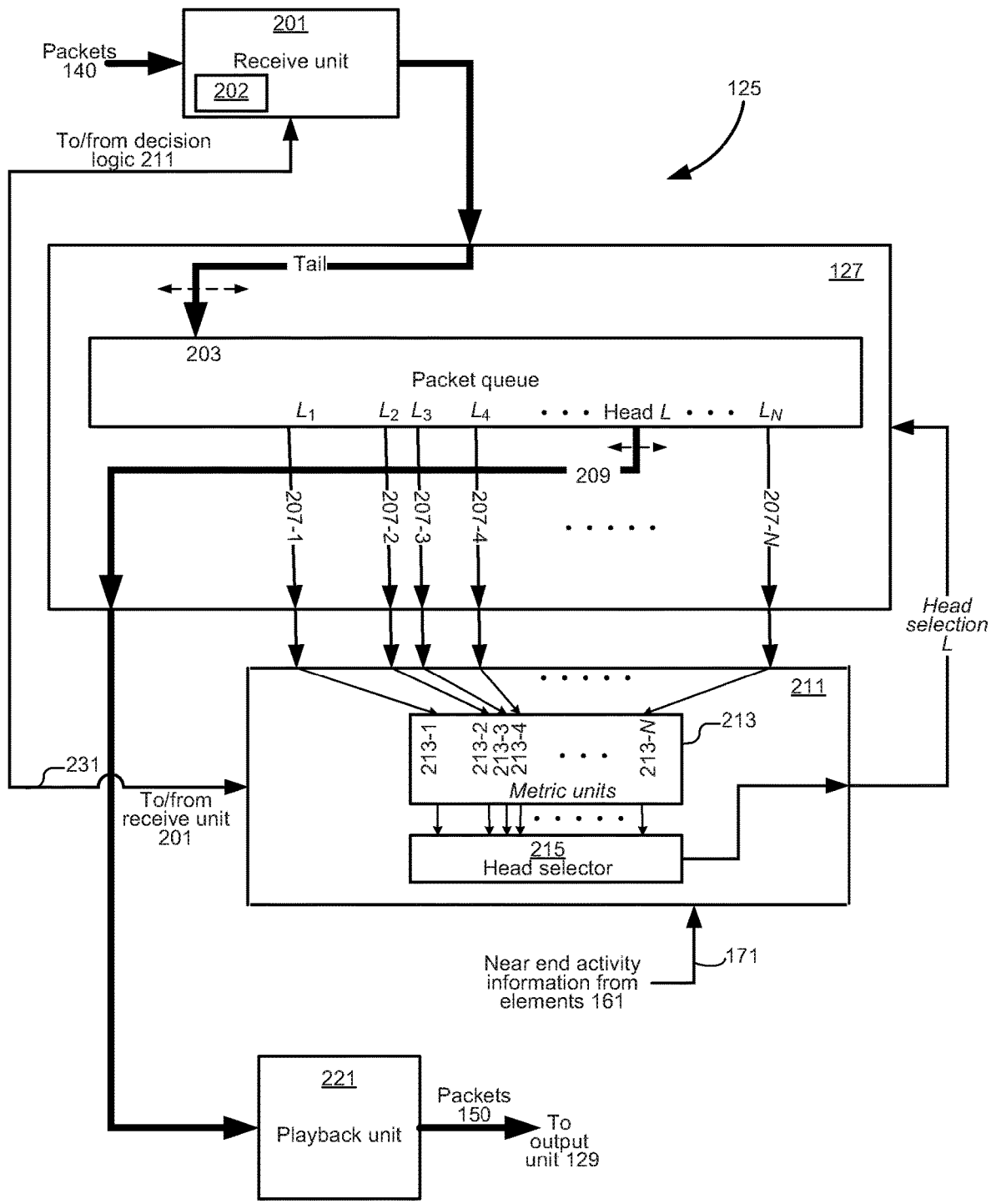
FIG. 2 shows a simplified block diagram an example embodiment of a jitter buffer subsystem.

FIG. 2 shows a simplified block diagram of an embodiment of a jitter buffer subsystem 125. The jitter buffer subsystem 125 includes a receive unit 201 operable to receive the packets from the network interface 123 of the receiving endpoint 121 (FIG. 1A). A jitter buffer data structure 127 (hereinafter referred to as the packet queue 127) includes a tail 203 wherein packets are inserted upon receipt. The receive unit 201 additionally determines the location of the tail 203, namely, where to put each packet in the packet queue 127 based on a function of the difference in sequence numbers of the most recently received packet and the highest sequence number of the packets received, which are known to be in the packet queue 127. This has the effect of re-ordering packets in such cases where the packets are received in an out-of-order mode. Note that in practical systems, only a few bits, typically 8-bits, is available for the sequence number, so the sequence number can wrap during the arrival of the packet sequence 140. Hence, appropriate definitions of "difference" and "highest" are required to be used. In some embodiments, a receive clock 202 is used to add a receive timestamp to arriving packets. In such embodiments, the difference between receive times as determined by a comparison of the receive timestamps is used to determine whether a sequence number has wrapped for systems that use a small sequence number, for example, 8 bits. Such implementation details would be clear to those skilled in the art, and will not be described in any further detail.

In one embodiment, only one copy of each received packets 140 is maintained in the packet queue 127.

In FIG. 2, the path followed by the packet payload, namely, the coded content and/or additional indications, is shown in thick lines. The signal paths that relate information about the packets, such as, index number, type of packet, timestamps, and the like, which may be referred to as bookkeeping information, is shown in thinner lines.

The jitter buffer data structure 127 (hereinafter a packet queue 127), includes at least one prototype head, in addition to the tail 203. Each prototype head defines a point in the buffer from which packets might be played back to achieve a respective distinct prototype target latency. The number of prototype heads is denoted by N (N≥1) and the associated prototype target latency of the i'th prototype head is denoted by $L_i$, i=1, ..., N.

FIG. 2 shows the N heads as heads 207-1, 207-2, 207-3, 207-4, ..., 207-N and the respective prototype target latencies of these heads as $L_1, L_2, L_3, L_4, \ldots L_N$. Information about the packets from each head is coupled to decision logic 211 that includes set 213 of metric units denoted 213-$i$, where i=1, ..., N each of which determines the performance metric, for example, the cost $M_i$ that a respective head i would incur where it to be used to achieve the respective target latency, $L_i$. Each of the metric units 213-1, ..., 213-N, determine the effect (the cost) of inserting a number of silence packet indicators at a particular timeslot corresponding to the start of a talk spurt should the packets be extracted from the queue at the respective head. In one embodiment, the cost determining each of metric units 213-1, ..., 213-N includes examining the cost (determined over a time interval) that would be achieved by outputting at each prototype head at every playback timeslot, for example, every 20 ms, one of: (a) a packet, namely, a real packet payload, (b) a packet and a content indicator of a first set of content indicators, and (c) no packet and a content indicator of a second set of content indicators.

In one embodiment, the first set of packet indicators includes a "normal" packet indicator that indicates that the packet is a normal packet, namely, the packet payload and an FEC packet indicator to indicate the FEC (forward error-correction) that is to be applied using the received packets to determine what payload to output when the data is played out from the buffer during actual playback time. The second set of packet indicators includes a "silence" packet indicator (hereinafter a "silence") that might be output after the end or prior to the start of a talk spurt to indicate that to achieve the required target latency would require inserting a silence at this timeslot, and a "conceal" packet indicator (hereinafter, a "conceal") to indicate that there is a packet missing, such that a conceal operation would need to be performed at the actual playback time if that prototype head's target latency was set as the actual delay to use during actual playback. Thus, the metric unit of a prototype head determines what action needs to be performed at playback time if this prototype head was used for actual playback, and what cost would result.

The decision logic 211 also includes a head selector 215 that determines a cost function of the costs of using the prototype target latencies of the prototype heads and selects a particular target latency and head location to actually use for the jitter buffer data structure 127. The jitter buffer data structure 127 includes an adjustable actual playback head 209 from which the packets are actually removed from the jitter buffer data structure 127 using the selected target latency. The head 209 is coupled to an actual playback unit 221 and the head selector 215 selects a target latency L, which is one of prototype target latencies $L_i$, for playback by the playback unit 221. In this regard, the playback unit 221 carries out the actions needed, whereby at the start of each talk spurt in order for the playback unit 221 to achieve the selected target latency L, it outputs at each timeslot (every 20 ms in one embodiment) (a) a packet, (b) a packet and either a normal indicator or an FEC indicator, or (c) no packet and either a silence or a conceal. Such actions are the same as the selected prototype head's metric unit assumed made at each output timeslot to determine the cost. In this manner, the particular target latency L of the jitter buffer subsystem 125 is determined at buffer readout time rather than at buffer input time. Furthermore, the target latency L of the jitter buffer subsystem 125 varies from time to time, for example, every output timeslot, for example, every 20 ms under the control of the decision logic 211.

The result of the playback unit 221 is the final output packet sequence 150 from the jitter buffer subsystem 125. This output packet sequence 150 is then decoded, conceals performed where necessary, FEC performed when indicated, and the packets converted to an analog audio signal using the one or more ADCs for playing to a user by the an output unit 129.

Alternate embodiments use different intervals of time, and also different methods of determining the performance metric and determining the function of the determined performance metrics to carry out the head selecting.

In order for the head selector 215 to properly select the actual target latency, the head selector 215 must ensure that even the packets that would be extracted from the prototype head that has the longest target delay have been taken into account by the metric unit of that longest-latency prototype head. That is, the jitter buffer data structure 127 needs to have therein all the packets whose information is used by all the metric units whose performance needs to be taken into account. Reference counting on the packets can be used to ensure the packet remains in memory until all metric units have finished with it. One embodiment carries this out by maintaining a reference count for each packet as the packet remains in the jitter buffer data structure 127. The reference count for a packet is initially, when the packet is received and enters the packet queue 127, set to one more than the number of prototype heads, for example, to N+1. Each time information of that packet is used by any one of the N metric units, the count is decremented by 1. This provides a means for indicating when that packet would have reached the longest-latency prototype head, such that the reference counts make sure that the head is selected only when all the heads' packets have been considered.

It will be appreciated that this embodiment requires information on when a packet enters the packet queue 127. As shown in FIG. 2, the jitter buffer subsystem 125 has an information link 231 located between the receive unit 201 and the decision logic 211. Also, as would be understood by those skilled in the art, the information maintaining aspects of the receive unit 201 may be considered to be part of the decision logic 211. Note that the information link 231 is also used to transmit receive timestamps from clock 202 in those embodiments that use such receive timestamp information not only in the reordering by the receive unit 201, but also in the decision logic 211.

For illustrative purposes, it is herein assumed that the metric determined by metric unit i (i=1, ..., N) is expressed as a cost denoted $M_i$ which is higher for results that will be provide the worse experience for a listener. That is, in some embodiments, the corresponding performance metric is a cost metric that is monotonically non-increasing as a function of the quality of the experience had by a listener were such a prototype head used as an actual head, such that the result of using a prototype head having a relatively high corresponding performance metric would provide a listener with a worse listening experience than if a prototype head with a lower corresponding performance metric were used. It will be appreciated that in an alternate set of embodiments, the corresponding performance metric is a quality metric that is a monotonically non-decreasing function of the quality of the sound to a listener were that prototype's head used for actual playback.

In a typical simple embodiment, the performance metric $M_i$ determined by each metric unit includes a measure of the number of conceals over a time interval, for example, the most recent 20 second period. In a variation of this embodiment, the performance metric $M_i$ may factor in the prevalence of forward error-correction (FEC) indicators. In this regard, it has been found that isolated FEC playout may be around 80-90% as good as a "normal" playout, from a sound perception viewpoint. As such, in determining the performance meteric $M_i$, FEC playout over a time interval may also count for 10-20% of a conceal.

In more general terms, in some embodiments, the prototype performance metric measured over time for each respective prototype head is the respective prototype performance metric $M_i$ over a pre-defined time interval. In some versions, the pre-defined time interval is 20 seconds. In some versions, the pre-defined time interval may be 30 seconds.

In some embodiments, the pre-defined time interval for each respective metric unit is a recent pre-defined time interval, for example, the most recent pre-defined time interval.

In some embodiments, the corresponding performance metric M determined by the metric unit of the associated prototype head i includes a function of the number of conceals that would have been generated using the associated prototype head over the pre-defined time interval to achieve the associated target latency. One such example of a function of the number of conceals is a linear function of the number of conceals, for example, the actual number of conceals. In some versions, the function of the conceals is proportional to the packet loss ratio that would be achieved using the associated prototype head over the pre-defined time interval.

In another set of embodiments, the corresponding performance metric penalizes added latency such that for two prototype heads that would have achieved the same packet loss ratio but with different delays, the prototype head that has the lower target latency is assigned the lower cost, namely, the better performance metric.

In some alternate embodiments, each metric unit uses a forgetting function designed such that recent conceals are considered worse than older conceals in the corresponding cost function used to select the head. In one version, the forgetting function is an exponential function.

In some embodiments, the corresponding performance metric may be perceptually motivated. For example, the corresponding performance metric determined by each metric unit may penalize more heavily output patterns that would occur at the respective prototype head that are known to be more noticeable to a listener than other output patterns (which would then be less heavily penalized by each metric unit). For example, it is known that strings of consecutive conceals would be more noticeable to a listener than sporadic individual conceals. Thus, in one embodiment, the metric unit associated with each respective head is a function of the number of strings of consecutive conceals that exceed a predefined length that would occur in the predefined time interval.

Selecting the Actual Head

Referring to FIG. 2, the head selector 215 receives from the metric units 213 the current set of generated cost metrics $M_1, M_2 \ldots M_N$. The head selector 215 also has information on the N target latencies $L_1, L_2 \ldots L_N$ of each of the prototype heads 207-1, 207-2, . . . , 207-M. Based on this information, the head selector 215 may select the actual latency L as the target latency of the set $L_1, L_2 \ldots L_N$ that minimizes a cost function, denoted $C_i$, i=1, . . . , N. This may be calculated for each prototype target latency as $$C_i = K_L L_i + K_M M_i, \; i=1, \ldots, N,$$

where $K_L$ and $K_M$ are the relative weights that indicate the relative importance of penalizing longer latency and worse performance, respectively. In some versions, $K_L$ and $K_M$ are pre-defined, while in other versions, $K_L$ and $K_M$ may depend on other factors, for example, the level of interactivity for endpoints that can also send.

Interactivity in the Endpoint 121

It will be appreciated that in some embodiments of the receiving endpoint 121, the receiving endpoint 121 may be capable of acting as a sending endpoint and may include hardware similar to that of sending endpoint 101 of FIG. 1A. As depicted, endpoint 121 includes local uplink elements 161 that may including one or more microphone and ADC combinations 163, a local mute button 167 (or equivalent) to mute the one or more microphones 163 thus providing indication within endpoint 121 on engagement and/or disengagement of the local mute button 167; a VAD (or SAD) 165 providing indication within endpoint 121 on local voice activity; and/or an explicit "request to talk" button 169 or equivalent providing indication within endpoint 121 on engagement and/or disengagement of the "request to talk" button. These elements may be provided in different combinations of the endpoint 121 to provide the jitter buffer subsystem 125 access to information 171 on near end speech.

In an embodiment of the system 100, the decision logic 211 may be able to perform conversational analysis over a time window spanning a relatively long interval time, for example, tens of seconds, to classify the level of interaction in the current (time portion) of the activity of the endpoint 121, namely, the activity in a conference in which the endpoint 121 may be participating.

In some embodiments, the decision logic is operative to classify (using information 171) the level of interactivity of the endpoint 121 into one of a set of different classes. Various embodiments for achieving this may include defining different sets of classes, and different methods of determining interactivity. As an example, different situations for which different classes might be defined include passively listening to a presentation, having a highly interactive conversation, all endpoints mutually silent waiting for speech, and so forth.

Thus, in some embodiments, the apparatus includes a mechanism operative to determine or receive a discrete measure of interactivity V and the corresponding costs used by the head selector 215 may depend on the determined measure of interactivity.

In one such set of embodiments, the mechanism for receiving the measure of interactivity may include an interactivity analyzer that, when operating, determines a measure of interactivity using information 171 provided on near-end activity.

In some versions, the corresponding performance cost $C_i$ that is determined by the head selector and which is associated with the i'th head, i=1, . . . , N, selects a longer target latency the less the level of interactivity indicated by the received or determined measure of interactivity over an interactivity-analysis time-interval.

In some embodiments, the receiving endpoint 121 may include uplink elements 161 that provide in information 171 an uplink talk flag indicating local input for uplink. In some such embodiments, the determination of the measure of interactivity includes performing an analysis of the relative amount of time the uplink talk flag is used over the interactivity-analysis time-interval.

In some versions, the uplink flag may be the output of a voice activity detector (VAD) or Signal Activity Detector (SAD) 165 in the receiving endpoint 121.

In this regard, many telephony devices, equip both software and hardware with a local mute switch, shown as mute 167. Users of such devices have become accustomed to engaging the mute switch when listening to long presentations from far end talkers. Therefore, the act of disengaging the mute switch 167 may be construed as an indication that the local talker intends to speak. As a result, a signal may be supplied to the jitter buffer decision logic 211 indicating that that the head selector 215 should select an actual target latency that is relatively short to allow interactivity to occur within the system. This may be achieved in one embodiment by the jitter buffer decision logic 211 changing the value of $K_L$ to a relatively small value when muted, but a larger value when unmuted.

Thus, in some versions, the receiving endpoint 121 can also send information and may include a microphone-mute switch which can be used to provide an indication of the measure of interactivity occurring within the system. Thus, this can be achieved by using information about a state of the microphone-mute switch of the receiving endpoint in which the jitter buffer subsystem 125 is included. In some embodiments, information about the state of use of the microphone-mute switch may include an indication of the disengagement of the microphone-mute switch. In some versions, the indication of disengagement of the mute switch indicates a desire to talk.

For large conferences involving a number of participants, it may be desirable to include a question and answer session among the participants. In such an embodiment, a button may be provided which can be activated by a user of a VoIP application to register that he or she wishes to ask a question. In such an embodiment, a queue of registered questions would be maintained by the system such that when it comes time for a user to ask his or her question, the value of $K_L$ may be raised to bias the jitter buffer more in favor of interactivity over quality.

According to one embodiment the receiving endpoint 121 may include uplink elements 161, such as a request-to-talk switch. In such an embodiment, the determining of the measure of interactivity may includes using information about the activity associated with the request-to-talk switch.

In other embodiments, the determined measure of interactivity may be indicative of a conversational class from a set of distinct conversational classes.

In some versions, the set of distinct conversational classes may include a low-interactivity class and a two-way conversation class. The two-way conversation class may indicate that there is activity in both the uplink and the downlink. It will be appreciated that in this embodiment, two-way conversation is not limited to a conversation with a single second party, but rather includes the case of a multi-party conference.

In some versions, more than two sets of conversational classes may be included, for example, the set of classes may further include an essentially-no-interactivity class, and a moderate-interactivity class.

In some versions, the determined level of interactivity is a non-discrete interactivity factor, the corresponding performance metric penalizes added latency by an amount that depends on the interactivity factor, such that such that a first interactivity factor indicating more interactivity than does a second interactivity factor results in a first performance metric that includes a higher penalty for added latency that does a second performance metric resulting from the second interactivity factor.

In some embodiments, the values of one or both of $K_L$ and $K_M$ depend on the level of interactivity.

Catastrophic Conceals

On certain classes of link, for example, Wi-Fi and 3G, the jitter characteristics of the network 111 can change dramatically every few minutes, for example, as other clients join or leave the network 111. In the case of cellular telephone applications, such changes may occur as one moves between cells/access points. On such networks, on the assumption that a receiving endpoint encounters a relatively large jump in latency, as may occur in the last 2-3 minutes of a conference as clients join or leave the network, such a large jump in latency may be indicated by a relatively long burst of conceals being calculated by the metric unit or units of the prototype heads that have shorter target delays. In such instances, it may be reasonable for the buffer decision logic to be configured to expect another such jump in the near future.

In some embodiments, the decision logic 211 of the catastrophic-conceal-burst detector detects any catastrophic conceal burst that would be generated by the prototype head having the least target latency over a conceal-burst-detector time-interval. For each of the one or more prototype heads, the corresponding performance metric may be penalized when a catastrophic conceal burst is detected in the prototype head having the least target latency, such that after a catastrophic-conceal burst is detected in the prototype head having the least target latency, the corresponding performance metric for each prototype head is penalized for the remainder of the a conceal-burst-detector time-interval.

In some versions, the catastrophic-conceal-burst is detected when a relatively short time interval contains 80 ms or more of conceals.

In some versions, the relatively short time interval is 300 ms.

In some versions, the conceal-burst-detector time-interval is at least 1 minute, such that after a catastrophic-conceal-burst is detected in the most recent 1 minute, the corresponding performance metric for each prototype head is penalized.

In some versions, the conceal-burst-detector time-interval is at least 2 minutes, such that after a catastrophic-conceal-burst is detected in the most recent 2 minutes, the corresponding performance metric for each prototype head is penalized.

In one embodiment, each metric unit includes an indicator $B_i$, i=1, ..., N that indicates 1 if a catastrophic conceal burst has been generated at the i'th prototype head over a relatively high conceal-burst-detector time-interval, otherwise 0. The cost function used by head selector 215 for the i'th prototype head for such an embodiment, again denoted $C_i$, i=1, ..., N, is calculated for each prototype target latency $L_i$, as $$C_i = K_L L_i + K_M M_i + K_B B_i, \ i=1, \ldots, N,$$

where $K_L$ and $K_M$, and $K_B$ are the relative weights that indicate the relative importance of penalizing longer latency, worse performance, and the presence of a burst of conceals, respectively.

In some versions, the conceal-burst-detector time-interval is at least 3 minutes, such that after a catastrophic-conceal-burst is detected in the most recent 3 minutes, the corresponding performance metric for each prototype head is penalized.

Multiple Sets of Target Latencies for the Prototype Heads

A set of embodiments includes incorporating pre-defined distinct sets of parameters. A distinct set of parameters may be a different set of the N target latencies $L_1, L_2, \ldots L_N$. In some embodiments, there may even be a different number of target latencies, namely, a different value of N. Some of the sets of parameters may also include corresponding $K_L$ and $K_M$ values, such that two different sets may have different values for $K_L$ and $K_M$. In the set of embodiments, each set of parameters is applied to a type of communication link (called a link class) with which or on which the receiving endpoint containing the jitter buffer subsystem 125 is operable. Thus, a set of classes of communication links, called link classes herein, may be defined. The link class for example may be the type of network the jitter buffer subsystem is operating on. In some versions, the selected set of link classes includes a wireless link class and an Ethernet link class.

In some versions, the link class is determined according to the hardware coupled to, or included in, the apparatus.

In some versions, the link class is determined automatically by classification based on network traffic statistics.

A Method Embodiment

Particular example embodiments include a method 300 of jitter buffering in an apparatus such as a receiving endpoint. The apparatus might be a hardware receiving terminal, or may be implemented on a processing system.

Figure 3:
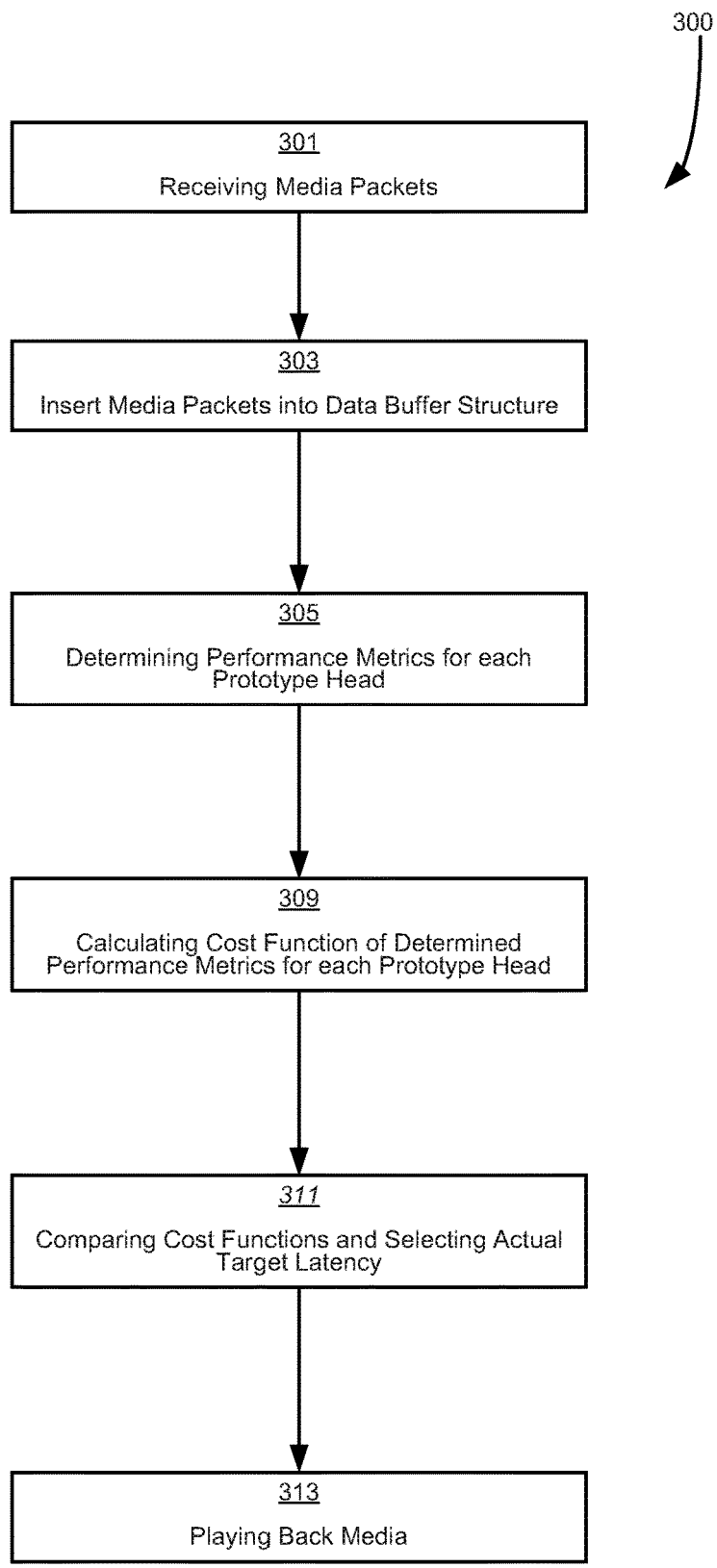
FIG. 3 shows a simplified flowchart of an example embodiment.

FIG. 3 shows a simplified flowchart of a method embodiment 300 that includes in 301 receiving packets 140 of media from a network 111. The received packets may have been packets 130 sent from a sending terminal that includes one or more microphones to process audio, for example, speech. The received packets include a payload and bookkeeping information, including an indicator of packet order, such as a sequence counter or a sending timestamp. The received packets also may include a start of talk spurt indicator, an end of talk spurt indicator, or both an end of talk spurt and a start of talk spurt indicators. Such indicators may be generated from a VAD (or SAD) in the sending endpoint 101.

The method 300 includes in step 303 for each received packet, inserting the received packet into a buffer data structure 127 via the single tail 203 of the buffer data structure 127. The buffer data structure 203 includes at least one prototype head (207-1, ..., 207-N for N prototype heads, N≥1), each prototype head defining a point in the buffer wherefrom packets could be played back (but are not for the purpose of selecting the actual head). Associated with each prototype head is a target latency to be achieved if the packet were extracted via that head.

The method includes in 305 determining, at a set of time instants, a respective performance metric for achieving the associated target latency for each of the prototype heads. The step of determining the performance metric includes calculating the performance metric that would be achieved by outputting at each prototype head one of: a packet, a packet and a content indicator of a first set of content indicators, and no packet and a content indicator of a second set of content indicators.

In step 309 the method further includes calculating respective values of a cost function of the determined performance metric for each of the prototype heads and prototype head's associated target latencies.

In step 311, the method further includes comparing the calculated cost functions and selecting an actual target latency based on the cost comparing, the selected target latency being one of the target latencies of the prototype heads, and thus determining the location for an actual playback head 209 of the buffer data structure from which packets are extracted for actual playback via an actual playback unit. In this manner, the method determines the actual target latency of the jitter buffer data structure at buffer readout time rather than at buffer input time.

In step 313, the method further includes playing back the media via the actual playback unit.

As in the apparatus sets of embodiments, the first set of packet indicators includes a "normal" packet indicator that the packet is a normal packet, and an FEC packet indicator to indicate that FEC (forward error-correction) has been applied to the packet. The second set of packet indicators includes a "silence" packet indicator (hereinafter a "silence") and a "conceal" packet indicator (hereinafter, a "conceal.")

Other sets of the method embodiments include one or more of the aspects described above for the apparatus embodiments.

Processing System Embodiments

While a receiving endpoint 121 that includes an example embodiment can be realized, for example, using special purpose hardware, some implementations of the receiving endpoint include a processing system.

Figure 4:
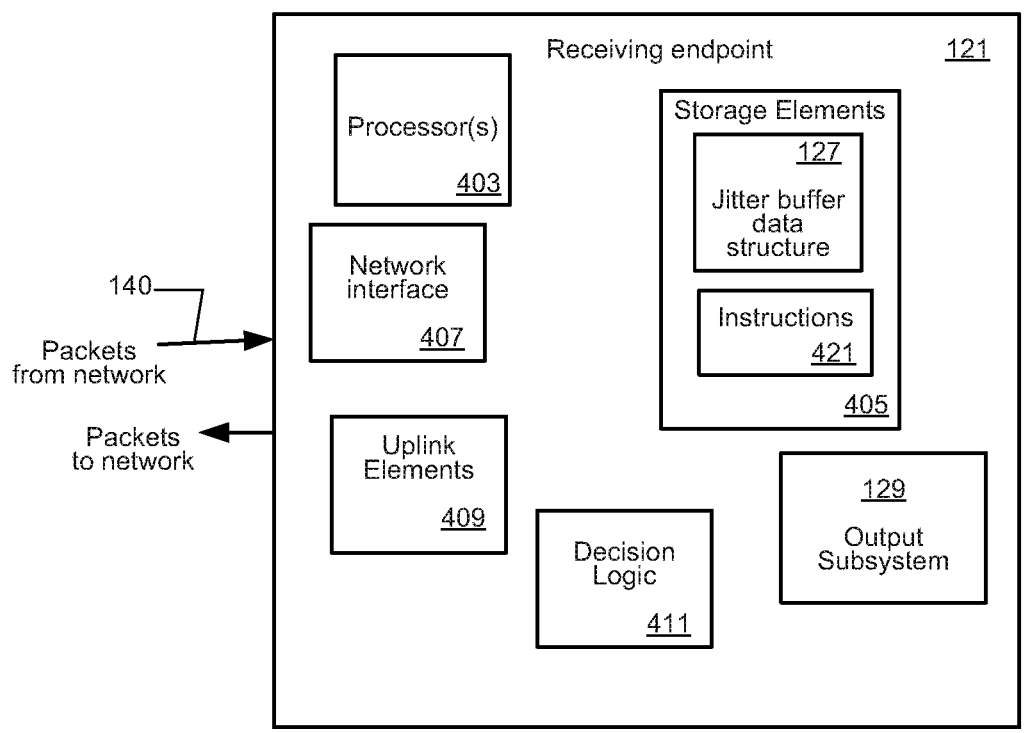
FIG. 4 shows one implementation of a receiving endpoint that includes a processing system in accordance with an example embodiment.

FIG. 4 shows a simplified block diagram of an embodiment of a receiving endpoint 121 that includes a processing system. The embodiment includes one or more processors 403 and a set of storage elements 405, typically in the form of memory elements. The jitter buffer data structure 127 is arranged as one element of the storage element 405. The endpoint embodiment further includes a network interface 407 that is operable to accept packets of media from the network 111. The network interface 407 may also, on the uplink, send packets of media.

The processor-based endpoint embodiment further includes such uplink elements as one or more microphones (mics) and ADCs 409, and other uplink elements as deemed necessary.

The functions of the receive unit 201, the decision logic 411, and the playback unit 221 are carried out by executing software, shown as instructions 421 in the storage subsystem 405. Elements of the output subsystem 129 also are included for playing back the media, including DACs in combination with loudspeakers. The instructions 421 also may include instructions for operating other aspects of the receiving endpoint 121. Not shown in FIG. 4 are such elements as a bus subsystem for coupling the shown elements, and some other standard elements that would be included in a processing system and in an endpoint as would be appreciated by those skilled in the art.

Thus, particular embodiments include a non-transitory machine-readable medium (as part of storage subsystem 405) coded with instructions (part of 421), that when executed by a processing system (the processors 403 and other elements of the endpoint), cause the endpoint to carry out any one of the above summarized methods, and also to implement some embodiments of the buffer subsystem as described above.

Figure 5:
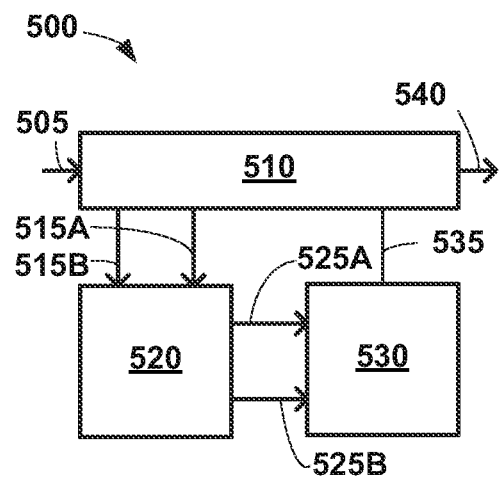
FIG. 5 shows a simplified block diagram an example embodiment of a jitter buffer subsystem.

Referring to FIG. 5, various embodiments comprise a jitter buffer system 500 for buffering teleconference or videoconference audio data.

The jitter buffer system 500 comprises a jitter buffer 510 configured to receive into a single queue a stream of data packets 505 comprising teleconference or videoconference audio data, such as the sequence of coded packets 140 described above. Typically, the received data packets are stored in chronological order according to transmission time. In some embodiments, the jitter buffer 510 is substantially the same as the jitter buffer data structure 127 described above.

The jitter buffer 510 outputs N buffered streams of data packets 515A, 515B from respective different positions along the single queue, wherein N>1. Each of the positions represents a different buffer length and, therefore, a different buffer latency. It will be appreciated that at least in this regard, the jitter buffer 510 bears some resemblance to a serial-in, parallel-out shift register. (N.B. In case the data packets are not stored in transmission-time order in the single queue, they may be placed in transmission-time order when being output from the respective different positions.) The jitter buffer 510 also outputs a variable-latency stream 540 of the data packets for playback; the control of the variable latency of the variable-latency stream 540 will be described later.

The jitter buffer system 500 further comprises silence compression/expansion logic 520 configured to receive the N buffered streams 515A, 515B, from which it generates N corresponding sequence-adjusted streams of data packets 525A, 525B.

The silence compression/expansion logic 520 is configured to generate the N sequence-adjusted streams 525A, 525B such that they correspond, respectively, to the N buffered streams 515A, 515B with some adjustments. More specifically, the adjustments are done according to a silence compression/expansion procedure whereby in each of the sequence-adjusted streams 525A, 525B a) one or more silence packets of the corresponding buffered stream is omitted ("silence compression") and/or b) one or more further silence packets is introduced ("silence expansion"). The silence compression/expansion procedure may be based on known silence compression/expansion techniques, e.g. as described in U.S. Pat. No. 6,366,959 B1 with reference to FIGS. 9 and 10 thereof. It will be appreciated that by performing the silence compression/expansion procedure on the N buffered streams after they are output from the jitter buffer 510, and not on the input stream before or during buffering, it becomes possible to use a single queue to store the received packets and still to obtain multiple, different-length buffers. Thus a memory saving is achieved, which is proportional to the number of buffers which are employed.

By means of the silence expansion/compression procedure, together with obtaining the N buffered streams 515A, 515B from respective different positions along the single queue, each of the N sequence-adjusted streams substantially corresponds to the received stream delayed by a respective latency which is unique relative to the other sequence-adjusted stream(s). These latencies may be the same as, or different from, the corresponding buffer latencies defined by the different output positions along the single queue in the jitter buffer 510.

The jitter buffer system 500 further comprises latency determination logic 530 configured to determine a jitter buffer latency parameter 535. First, the latency determination logic 530 ranks the N sequence-adjusted streams 525A, 525B according to a latency criterion and a quality criterion. These criteria may be weighted evenly or unevenly in performing the ranking. Second, the latency determination logic 530 uses the latency corresponding to a highest-ranked one of the sequence-adjusted streams 525A, 525B as the jitter buffer latency parameter 535. The latency determination logic 530 is further configured to provide the determined jitter buffer latency parameter 535, or a corresponding (e.g., normalized) value, to the jitter buffer 510 as the variable latency of the variable-latency stream. The jitter buffer 510 is configured to output the variable-latency stream 540 from one of a plurality of different positions along the jitter buffer according to the variable latency of the variable-latency stream, as set by the jitter buffer latency parameter 535. In some embodiments, the variable-latency stream 540 is provided to a unit equivalent to the playback unit 221 described above, which performs substantially the same operations.

In some embodiments, ranking the N sequence-adjusted streams 525A, 525B comprises using a quality evaluation procedure to determine respective quality values for the N sequence-adjusted streams. For example, according to the quality evaluation procedure, each of the determined quality values is at least indicative of a current extent of packet concealment in the corresponding sequence-adjusted stream, whereby a relatively high quality value would usually be indicative of a relatively low extent of packet concealment. In the same example or in a different example, according to the quality evaluation procedure, each of the determined quality values is at least indicative of a current packet loss ratio of the corresponding sequence-adjusted stream, whereby a relatively high quality value would usually be indicative of a relatively low packet loss ratio.

In some embodiments, ranking the N sequence-adjusted streams comprises using a latency evaluation procedure to determine respective latency values for the N sequence-adjusted streams. For example, according to the latency evaluation procedure, each of the determined latency values is at least indicative of whether the latency associated with the corresponding sequence-adjusted stream exceeds a desired latency, whereby a relatively high quality value would usually be indicative of the desired latency not being exceeded. In the same or another example, according to the latency evaluation procedure, each of the determined latency values is at least indicative of how near the unique latency of the corresponding sequence-adjusted stream is to the desired latency, whereby a relatively high quality value would usually be indicative of the latency associated with the corresponding sequence-adjusted stream being relatively near to the desired latency (e.g., not more than 10% higher or lower than the desired latency).

Figure 6:
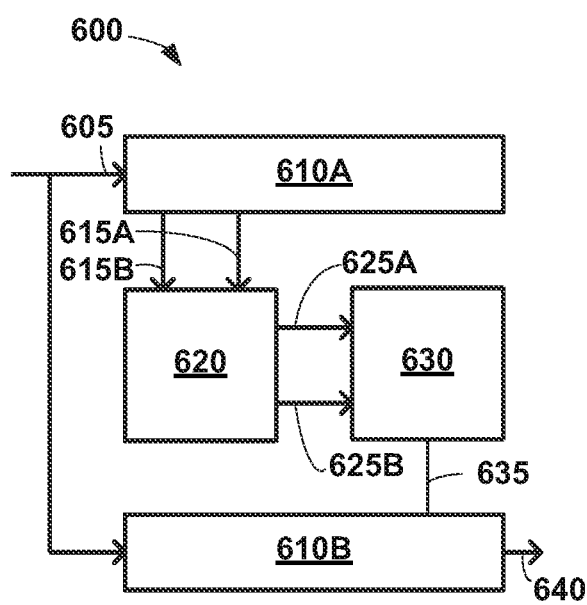
FIG. 6 shows a simplified block diagram an example embodiment of a jitter buffer subsystem.

Referring now to FIG. 6, various embodiments comprise a jitter buffer system 600 for buffering teleconference or videoconference audio data.

The jitter buffer system 600 comprises a jitter buffer 610A configured to receive into a single queue a stream of data packets 605 comprising teleconference or videoconference audio data, such as the sequence of coded packets 140 described above. The jitter buffer 610A is the same as the previously-described jitter buffer 510A except that it does not output a stream of the data packets for playback. Instead, as will be described below, the jitter buffer system 600 comprises a further jitter buffer 6108 which outputs a variable-latency stream 640 of the data packets for playback. In various embodiments, the further jitter buffer 6108 performs silence compression/expansion as the packets are placed into the further jitter buffer 6108. In other embodiments, silence compression/expansion may be performed on the variable-latency stream 640 in substantially the same manner as described above in respect of the silence compression/expansion logic 520.

The jitter buffer system 600 further comprises silence compression/expansion logic 620 and latency determination logic 630 which are the same as previously-described silence compression/expansion logic 520 and latency determination logic 530, respectively. As such, the silence compression/expansion logic 620 generates N sequence-adjusted streams of data packets 625A, 625B corresponding to N buffered streams of the data packets 615A, 615B that it receives from the jitter buffer 610A, and the latency determination logic 630 determines a jitter buffer latency parameter 635 from the N sequence-adjusted streams 625A, 625B.

The determination logic 630 provides the jitter buffer latency parameter 635 to the further jitter buffer 615B as the variable latency of the variable-latency stream 640.

In some embodiments, the variable-latency stream 640 is provided to a unit equivalent to the playback unit 221 described above, which performs substantially the same operations.

Features of Some Embodiments

Thus, there has been described a novel jitter buffer subsystem that determines the target latency at the time packets are removed from the buffer rather than at the time packets are entered.

In an embodiment, only one copy of payload of a received packet is buffered or maintained in a packet data structure. What we call "bookkeeping information" is maintained as if there are several jitter buffers with extractions points at each of the prototype heads and whose performance can be compared.

Another related embodiment is in the form of an apparatus described herein that makes it possible to compare a performance that would be achieved from a plurality of output packet streams. However, only a single packet queue is used, and the prototype streams for comparing performance are derived from the same packet queue using multiple heads, each having a different latency. Unlike the case of using multiple jitter buffers that are coupled to a selector that selects the contents of one of the multiple buffers, only a single packet buffer is maintained. The "multiple" part is the multiple heads, which maintain bookkeeping information about packets that could have been extracted.

Another aspect is the relative simplicity of implementation compared to jitter buffering methods and systems that include determining complicated histograms or CDF that need to be kept as state.

One aspect is providing straightforward control over the tradeoff between latency and conceal rate by changing the relative weights of the cost function. Indeed, this brings out another feature of some embodiment, that implementations can easily be modified to use a different cost function. For example, a cost function can be constructed that can factor in differences in FEC recovery ratio for different latencies.

One aspect is that the cost function and/or performance metrics can be perceptually motivated. For example, one can modify the cost metric so that it can penalizes output patterns that have historically produced strings of consecutive conceals, which usually are much more noticeable than isolated conceals.

Generalizations

In the case of audio, note that while the G722 ITU-T recommendation was mentioned in the embodiments above, with frames that are 20 ms long, and packetization that includes a single frame per packet, the example embodiments are not so limited. For example, the embodiments may be used for video as well as audio, and in the case of audio, in any method of coding and packetizing audio into packets of digitized audio information. Some known audio coding standards/methods and the name of their introducer include, but are not limited to: AMR, AMR-WB– now ITU-T G.722.2, and AMR-WB+ (3GPP); ALAC (Apple Inc.); apt-X (APTX); SBC (Bluetooth SIG); BroadVoice: BV16& BV32 (Broadcom); WavPack (Conifer Software); Codec2 (David Rowe); AMBE (Digital Voice Systems); AC-3 and Enhanced AC-3 (Dolby Laboratories, inc.); GSM-FR (ETSI Special Mobile Group); Musepack (Frank Klemm/MDT); iLBC and iSAC (Global IP Solutions); Opus (IETF); AAC, ALS, MP2 (MPEG-1, 2 Audio Layer II), and MP3 (ISO/IECMPEG Audio Committee); G.711, G.722, G.722.1, G.723.1, G.726, G.728, G.729, and from 3GPP, G.722.2 (ITU-T); Monkey's Audio (Matthew T. Ashland); Windows Media Audio (Microsoft); Nellymoser Asao (Nellymoser Inc.); TwinVQ (Nippon Telegraph and Telephone); Siren 7 (PictureTel Corp. (nowPolycom Inc.)); SILK and SVOPC (Skype Limited); ATRAC (Sony Corp.); True Audio (TTA) (TAU Software); Shorten (Tony Robinson); and Vorbis/Ogg, CELT, Speex, and FLAC (Xiph.Org Foundation and individuals.

Furthermore, note that while a circular buffer and a packet queue is mentioned in the above embodiments for the jitter buffer data structure, other different data structures are known and may be used to realize the functionality of the jitter buffer data structure.

General

Unless specifically stated otherwise, as apparent from the following discussions, it is appreciated that throughout the specification discussions utilizing terms such as "processing," "computing," "calculating," "determining" or the like, refer to the action and/or processes of a host device or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, for example, from registers and/or memory to transform that electronic data into other electronic data that, for example, may be stored in registers and/or memory.

The methodologies described herein are, in one embodiment, performable by one or more processors that accept machine-readable instructions, for example, as firmware or as software, that when executed by one or more of the processors carry out at least one of the methods described herein. In such embodiments, any processor capable of executing a set of instructions (sequential or otherwise) that specify actions to be taken may be included. Thus, one example is a programmable digital signal processor (DSP) device. Another is the CPU of a microprocessor or other computer-device, or the processing part of a larger application specific integrated circuit (ASIC). A processing system may include a memory subsystem including main RAM and/or a static RAM, and/or ROM (each of these being an example of a non-transitory computer-readable medium). A bus subsystem may be included for communicating between the components. The processing system further may be a distributed processing system with processors coupled wirelessly or otherwise, for example, by a network. If the processing system requires a display, such a display may be included. The processing system in some configurations may include a sound input device, a sound output device, and a network interface device. The memory subsystem thus includes a machine-readable non-transitory medium that is coded with, or has stored therein, a set of instructions to cause performing, when executed by one or more processors, one of more of the methods described herein. Note that when the method includes several elements, for example, several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, or having stored therein, a set of instructions for execution on one or more processors, for example, one or more processors that are part of the receiver forming a pen stroke capture system.

Note that, as is understood in the art, a machine with application-specific firmware for carrying out one or more example embodiments becomes a special purpose machine that is modified by the firmware to carry out the example embodiments. This is different from a general purpose processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of the processor used in a design, and automatically or mostly automatically great a design of special-purpose hardware, for example, generate instructions to modify a gate array or similar programmable logic, or that generate an integrated circuit to carry out the functionality previously carried out by the set of instructions. While some general skill may be required to so generate the gate array or similar programmable logic, or an integrated circuit, those aspects are standard, and may be contracted to be realized using standard design methodologies once the design described herein is provided. Thus, as will be appreciated by those skilled in the art, example embodiments may be in the form of a method, an apparatus such as a special purpose apparatus, an apparatus such as a DSP device plus firmware, or a non-transitory machine-readable medium. The machine-readable carrier medium carries host device readable code including a set of instructions that when executed on one or more processors cause the processor or processors to implement a method. Accordingly, example embodiments may take the form of a method, an entirely hardware embodiment, an entirely software embodiment or an embodiment combining software and hardware aspects. Furthermore, example embodiments may take the form a computer program product on a non-transitory machine-readable storage medium encoded with machine-executable instructions.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims requires more features than are expressly recited therein. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate example embodiments.

Furthermore, while some embodiments described herein include some but not other features included in other embodiments, combinations of features of different embodiments are meant to be within the scope of the overall apparatus and method, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the example embodiments.

In the description provided herein, numerous specific details are set forth. However, it is understood that example embodiments may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms including, included of or which includes is an open term that means including at least the elements/features that follow, but not excluding others. Thus, the term including, when used in the claims, should not be interpreted as being limitative to the means or elements or steps listed thereafter. For example, the scope of the expression a device including A and B should not be limited to devices consisting only of elements A and B. Any one of the terms including or which includes or that includes as used herein is also an open term that also means including at least the elements/features that follow the term, but not excluding others. Thus, including is synonymous with and means including.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path that includes other devices or mechanisms along the path. "Coupled" may mean that two or more elements are either in direct physical or electrical contact, or that two or more elements are not in direct contact with each other but yet still co-operate or interact with each other.

Thus, while there has been described what are believed to be the example embodiments, those skilled in the art will recognize that other and further modifications may be made thereto, and it is intended to claim all such changes and modifications as fall within the scope of the various embodiments. For example, any formulas given above are merely representative of procedures that may be used. Functionality may be added or deleted from the block diagrams and operations may be interchanged among functional blocks. Steps may be added or deleted to methods described herein.

Note that the claims attached to this description form part of the description, so are incorporated by reference into the description, each claim forming a different set of one or more embodiments.

Various aspects of the present disclosure may be appreciated from the following numbered enumerated example embodiments ('EEEs'):

1. An apparatus operative to receive packets of media from a network, comprising:
   a receiver unit operative to receive the packets from the network;
   a jitter buffer data structure for receiving the packets in an ordered queue, the jitter buffer data structure having a tail into which the packets are input; a plurality of heads defining points in the jitter buffer data structure from which the ordered queue of packets are to be played back, the heads comprise an adjustable actual playback head coupled to an actual playback unit and at least one prototype head, each prototype head having associated therewith a target latency;
   a processor having decision logic operable to determine a cost of achieving the associated target latency for each prototype head, wherein the decision logic compares the costs determined for each prototype head to identify a particular target latency and head location for the actual playback head of the buffer; and
   a playback unit coupled to the processor for actual playback of the playback head of the buffer, such that the particular target latency of the jitter buffer data structure is determined at playback of the buffer rather than upon input of the packets into the jitter buffer data structure.
2. An apparatus according to EEE 1, wherein the processor determines the cost of achieving the associated target latency for each prototype head by examining the cost that would be achieved by outputting at each prototype head one of: a packet, a packet and a content indicator of a first set of content indicators, or no packet and a content indicator of a second set of content indicators.
3. An apparatus according to EEE 1, wherein, each prototype head is coupled to an associated metric unit in the decision logic, the metric unit being operable to determine a corresponding performance metric achieved by each prototype head.
4. An apparatus according to EEE 3, wherein each metric unit tracks the performance over a pre-defined time interval of its associated prototype head, thereby determining the corresponding performance metric.
5. An apparatus according to EEE 3, wherein the pre-defined time interval is a most recent pre-defined time interval and the corresponding performance metric is a function of the number of conceals generated using the associated prototype head over the most recent time interval to achieve the associated target latency.
6. An apparatus according to EEE 4, wherein the corresponding performance metric penalizes added latency such that for two prototype heads achieving the same packet loss ratio and different target latencies, the prototype head that has the lower target latency achieves is assigned the better performance metric.
7. An apparatus according to EEE 3, wherein the performance metric achieved by each prototype head is compared by the decision logic.
8. An apparatus according to EEE 3, wherein the performance metrics of the prototype heads are compared to determine an actual target latency equal to one of the target latencies, the adjustable actual playback head is selected to have the actual target latency and the output of the jitter buffer data structure to the playback unit is from the adjustable actual playback head.
9. An apparatus according to any of the preceding EEEs, wherein the apparatus comprises a mechanism for receiving information on near end activity, and such information is used by the processor to determine a measure of interactivity.
10. A jitter buffering method in an apparatus that comprises a jitter buffer data structure and processing hardware, comprising:
    receiving packets of media from a network;
    inputting each received packet into the jitter buffer data structure via a tail, the jitter buffer data structure comprises a plurality of heads defining a point in the buffer from which packets may be played back, the plurality of heads comprise an adjustable actual playback head coupled to an actual playback unit, and at least one prototype head having associated therewith a target latency;
    determining costs of achieving the associated target latency for each prototype head;
    calculating and comparing a respective cost function for each respective prototype head having the associated target latency;
    selecting a particular target latency and head location for an actual playback head of the jitter buffer data structure based on comparing the costs; and
    playing back the media via a playback unit.
11. A jitter buffering method according to EEE 10, wherein the step of playing back the media comprises coupling the actual playback head to a playback unit.
12. A jitter buffering method according to EEE 10, wherein the step of collecting a particular target latency is determined at playback time rather than at buffer input time.
13. A jitter buffering method according to EEE 10, wherein the step of determining costs comprises examining the cost that would be achieved by outputting at each prototype head one of: a packet, a packet and a content indicator of a first set of content indicators, or no packet and a content indicator of a second set of content indicators.
14. A non-transitory machine-readable medium coded with instructions, that when executed by a processing system in a receiving endpoint, carry out any one of the above methods according to EEEs 10-13.

The invention claimed is:

1. A system for dynamically determining a latency parameter for a jitter buffer, the system comprising:
   a jitter buffer configured to buffer an input stream of data packets comprising teleconference or videoconference audio data, outputting the data packets from N different output positions along the jitter buffer, N>1, thereby generating N buffered streams of the data packets in parallel;
   silence compression/expansion logic configured to receive the N buffered streams, and to generate therefrom N corresponding sequence-adjusted streams of the data packets by, in each of the sequence-adjusted streams, a) omitting one or more silence packets of the corresponding buffered stream and/or b) introducing one or more further silence packets, wherein each of the N sequence-adjusted streams is associated with a different latency relative to the input stream; and
   latency determination logic configured to determine a jitter buffer latency parameter by ranking the N sequence-adjusted streams according to a latency criterion and a quality criterion, and taking the latency corresponding to a highest-ranked one of the sequence-adjusted streams as the jitter buffer latency parameter.
2. The system of claim 1, wherein ranking the N sequence-adjusted streams comprises determining respective quality values for the N sequence-adjusted streams, each of the quality values being indicative of at least one of: packet concealment; or packet loss ratio.

3. The system of claim 1, wherein ranking the N sequence-adjusted streams comprises determining respective latency values for the N sequence-adjusted streams, each of the latency values being indicative of at least one of: whether the latency associated with the corresponding sequence-adjusted stream exceeds a desired latency; or a magnitude of difference between the corresponding sequence-adjusted stream and the desired latency.

4. The system of claim 1 wherein the jitter buffer is configured to output a variable-latency stream of the data packets for playback, wherein the latency determination logic is further configured to provide the determined jitter buffer latency parameter to the jitter buffer as the variable latency of the variable-latency stream.

5. The system of claim 4 wherein the jitter buffer is configured to output the variable-latency stream from one of a plurality of different positions along the jitter buffer according to the variable latency of the variable-latency stream.

6. The system of claim 1 comprising a further jitter buffer configured to receive the input stream of data packets and to output a variable-latency stream of the data packets for playback, wherein the latency determination logic is further configured to provide the determined jitter buffer latency parameter to the further jitter buffer as the variable latency of the variable-latency stream.

7. A method for dynamically determining a latency parameter for a jitter buffer, the method comprising:
    using a jitter buffer to buffer an input stream of data packets comprising teleconference or videoconference audio data, outputting the data packets from N different output positions along the jitter buffer, N>1, thereby generating N buffered streams of the data packets in parallel;
    generating, from the N buffered streams, N corresponding sequence-adjusted streams of the data packets by, in each of the sequence-adjusted streams, a) omitting one or more silence packets of the corresponding buffered stream and/or b) introducing one or more further silence packets, wherein each of the N sequence-adjusted streams is associated with a different latency relative to the input stream; and
    determining a jitter buffer latency parameter by ranking the N sequence-adjusted streams according to a latency criterion and a quality criterion, and taking the latency corresponding to a highest-ranked one of the sequence-adjusted streams as the jitter buffer latency parameter.

8. The method of claim 7, wherein ranking the N sequence-adjusted streams comprises determining respective quality values for the N sequence-adjusted streams, each of the quality values being indicative of at least one of: packet concealment; or packet loss ratio.

9. The method of claim 7, wherein ranking the N sequence-adjusted streams comprises determining respective latency values for the N sequence-adjusted streams, each of the latency values being indicative of at least one of: whether the latency associated with the corresponding sequence-adjusted stream exceeds a desired latency; or a magnitude of difference between the corresponding sequence-adjusted stream and the desired latency.

10. The method of claim 7, wherein the jitter buffer is configured to output a variable-latency stream of the data packets for playback, wherein the latency determination logic is further configured to provide the determined jitter buffer latency parameter to the jitter buffer as the variable latency of the variable-latency stream.

11. The method of any claim 7, wherein the jitter buffer is configured to output the variable-latency stream from one of a plurality of different positions along the jitter buffer according to the variable latency of the variable-latency stream.

12. The method of claim 7 comprising a further jitter buffer configured to receive the input stream of data packets and to output a variable-latency stream of the data packets for playback, wherein the latency determination logic is further configured to provide the determined jitter buffer latency parameter to the further jitter buffer as the variable latency of the variable-latency stream.

13. A tangible, non-transitory computer readable medium storing one or more computer programs comprising instructions which, when executed by one or more processors of a system, cause the system to perform the method of claim 7.

* * * * *